United States Patent
White et al.

(10) Patent No.: US 11,481,579 B2
(45) Date of Patent: Oct. 25, 2022

(54) AUTOMATIC LABELING OF OBJECTS IN SENSOR DATA

(71) Applicant: Waymo LLC, Mountain View, CA (US)

(72) Inventors: Brandyn White, Mountain View, CA (US); Congyu Gao, Palo Alto, CA (US); Sean Rafferty, Sunnyvale, CA (US); Nicholas Armstrong-Crews, Mountain View, CA (US)

(73) Assignee: Waymo LLC, Mountain View (CA)

( * ) Notice: Subject to any disclaimer, the term of this patent is extended or adjusted under 35 U.S.C. 154(b) by 396 days.

(21) Appl. No.: 16/833,018

(22) Filed: Mar. 27, 2020

(65) Prior Publication Data

US 2021/0150280 A1 May 20, 2021

Related U.S. Application Data

(60) Provisional application No. 62/935,112, filed on Nov. 14, 2019.

(51) Int. Cl.
| | |
|---|---|
| *G06V 20/70* | (2022.01) |
| *G06K 9/62* | (2022.01) |
| *B60W 60/00* | (2020.01) |
| *H04W 4/021* | (2018.01) |
| *G01C 21/36* | (2006.01) |
| *G06V 20/56* | (2022.01) |
| *G06V 20/58* | (2022.01) |

(52) U.S. Cl.
CPC ....... *G06K 9/6259* (2013.01); *B60W 60/0011* (2020.02); *G01C 21/3605* (2013.01); *G06V 20/56* (2022.01); *G06V 20/58* (2022.01); *H04W 4/022* (2013.01)

(58) Field of Classification Search
CPC ........ G06V 70/20; G06V 20/56; G06V 20/58; G06K 9/6259; G01C 21/3605; B60W 60/0011; H04W 4/021; H04W 4/022; H04W 4/023
See application file for complete search history.

(56) References Cited

U.S. PATENT DOCUMENTS

| | | | |
|---|---|---|---|
| 9,868,446 B1 * | 1/2018 | Zhu | B60R 1/00 |
| 10,754,338 B2 * | 8/2020 | Deiters | G06V 20/58 |

(Continued)

FOREIGN PATENT DOCUMENTS

WO     2019000417 A1     1/2019

*Primary Examiner* — Jessica M Prince
(74) *Attorney, Agent, or Firm* — Botos Churchill IP Law

(57) ABSTRACT

Aspects of the disclosure provide for automatically generating labels for sensor data. For instance first sensor data for a first vehicle is identified. The first sensor data is defined in both a global coordinate system and a local coordinate system for the first vehicle. A second vehicle is identified based on a second location of the second vehicle within a threshold distance of the first vehicle within the first timeframe. The second vehicle is associated with second sensor data that is further associated with a label identifying a location of an object, and the location of the object is defined in a local coordinate system of the second vehicle. A conversion from the local coordinate system of the second vehicle to the local coordinate system of the first vehicle may be determined and used to transfer the label from the second sensor data to the first sensor data.

20 Claims, 18 Drawing Sheets

(56) References Cited

U.S. PATENT DOCUMENTS

2019/0258878 A1     8/2019   Koivisto et al.
2019/0294889 A1*    9/2019   Sriram ................. G06V 20/584
2019/0310651 A1    10/2019   Vallespi-Gonzalez et al.
2021/0063578 A1*    3/2021   Wekel .................. G06K 9/6271

* cited by examiner

400

AUTOMATIC LABELING OF OBJECTS IN SENSOR DATA

CROSS REFERENCE TO RELATED APPLICATIONS

The present application claims the benefit of the filing date of U.S. Provisional Patent Application No. 62/935,112, filed Nov. 14, 2019, the disclosure of which is hereby incorporated herein by reference.

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. Autonomous vehicles are equipped with various types of sensors in order to detect objects in the surroundings. For example, autonomous vehicles may include sonar, radar, camera, LIDAR, and other devices that scan and record data from the vehicle's surroundings.

SUMMARY

Figure 1:
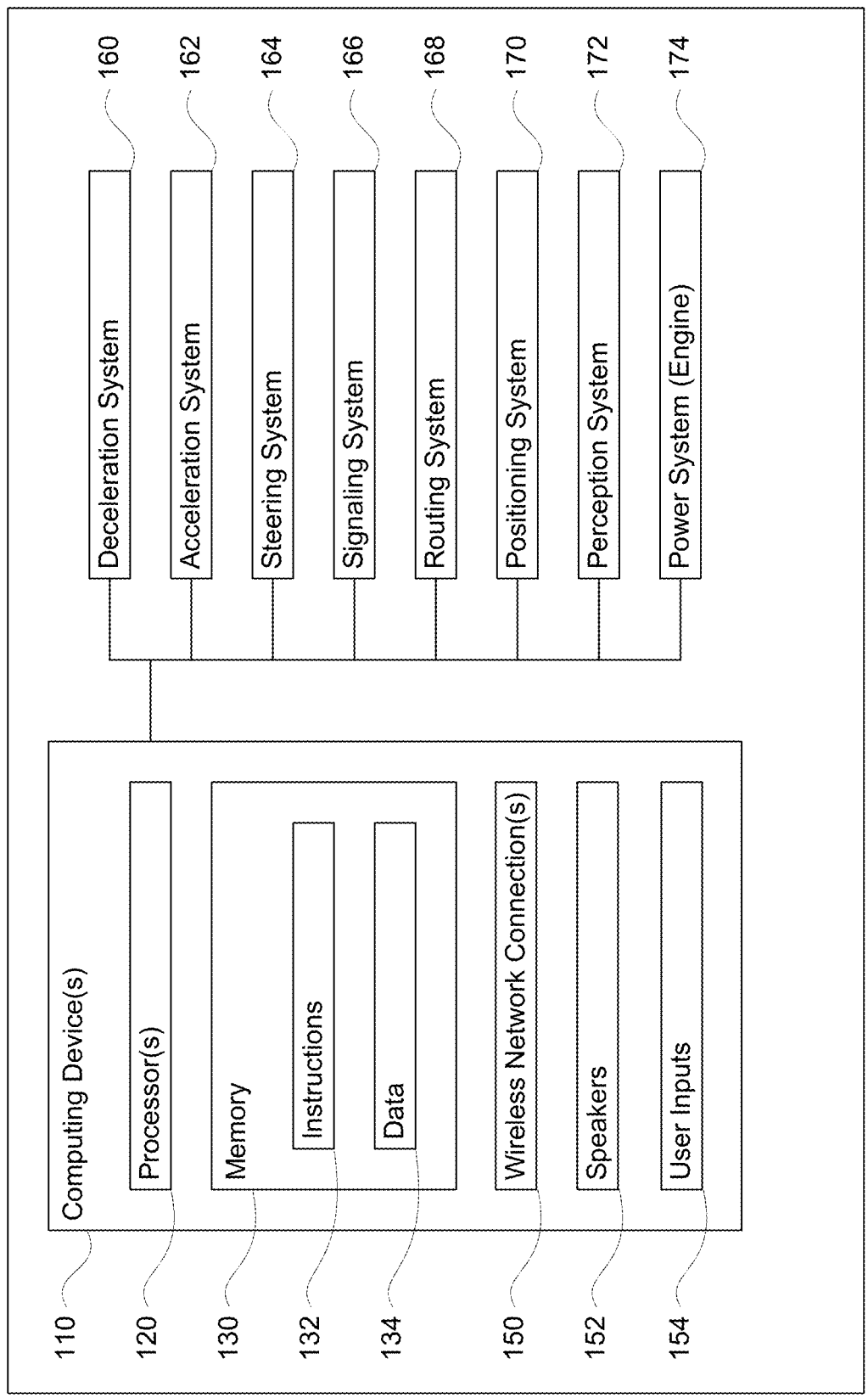
FIG. 1 is a functional diagram of an example vehicle in accordance with an exemplary embodiment.

Aspects of the disclosure provide a method for automatically generating labels for sensor data. The method includes identifying, by one or more processors, first sensor data for a first vehicle, wherein the first sensor data was captured by one or more sensors of a first vehicle at a first location during a first timeframe, wherein the first location is defined in both a global coordinate system and a local coordinate system for the first vehicle; identifying, by the one or more processors, a second vehicle based on a second location of the second vehicle within a threshold distance of the first vehicle within the first timeframe, wherein the second vehicle is associated with second sensor data captured by one or more sensors of the second vehicle at the second location during a second timeframe that overlaps with the first timeframe, wherein the second sensor data is associated with a label identifying a location of an object, the location of the object being defined in a local coordinate system of the second vehicle, and wherein the second location is defined in both the global coordinate system and the local coordinate system; determining, by the one or more processors, a conversion from the local coordinate system of the second vehicle to the local coordinate system of the first vehicle; applying the conversion to the location of the object identified in the label; and transferring, by the one or more processors, the label with the conversion applied to the location to the first sensor data.

In one example, the local coordinate system for the vehicle is defined by a location of the vehicle at a time when the first vehicle was last turned on before the first sensor data was generated. In another example, the one or more sensors include one or more of a LIDAR sensor, camera, radar, sonar, or microphone. In another example, the threshold distance is a radial distance from the first location. In another example, the threshold distance corresponds to an area beyond a sensor range of at least one of the one or more sensors of the first vehicle. In another example, the threshold distance includes an orientation component. In another example, the second sensor data is further associated with a second label for the object, and wherein the second label is also transferred to the first sensor data. In this example, the second label identifies a type of the object. In another example, determining the conversion includes determining a difference between global coordinate system coordinates of an origin of the local coordinate system of the first vehicle and global coordinate system coordinates of an origin of the local coordinate system of the second vehicle. In this example, the global coordinate system coordinates of the origin of the local coordinate of the first vehicle may be determined from both the global coordinate system definition of the first location and the local coordinate system for the first vehicle definition of the first location. In this example, the global coordinate system coordinates of the origin of the local coordinate of the second vehicle may be determined from both the global coordinate system definition of the second location and the local coordinate system for the second vehicle definition of the second location. In addition or alternatively, applying the conversion includes subtracting the difference from the location of the object. In another example, the first sensor data and second sensor data are time synced via GPS timing signals. In another example, transferring the label with the conversion applied to the location to the first sensor data comprises associating the label with the object in the first sensor data.

Other aspects of the disclosure provide a system having one or more processors configured to perform any of the methods described above and herein.

DETAILED DESCRIPTION

Overview

The technology relates to automatically generating labels for objects represented in sensor data. Typical labeling efforts may involve utilizing human operators to create labels which can be time consuming and costly or using complex algorithms for processing the sensor data in order to identify and label objects in the sensor data. Labeling objects may be critical for training neural networks and evaluating performance of an autonomous vehicle as well as its perception system. In some instances, it may be useful to have labels for objects that are within range of all the autonomous vehicle's sensors, but which are not within the fields of view of some of those sensors. For example, a side-mounted camera may be able to see past an object that occludes a top-mounted laser sensor. Having labels with such information may therefore be useful. In other instances, it may be useful to have labels for objects that are beyond the current detection range of some of an autonomous vehicle's sensors, which would otherwise not be detectable by the vehicle's perception system (e.g. given the vehicle's current sensors/sensor configuration there may be occlusions), which would not otherwise be detectable due to weather conditions (e.g. a laser-based sensor may not be able to detect objects at longer distances in fog, rain or snowy conditions), or would not be perceptible by a human operator reviewing the sensor data. For example, long range camera images may capture objects that are beyond the range of the LIDAR or radar, but the camera images may not provide accurate depth information sufficient for labeling.

One approach for automatically generating labels may involve an offline process using one or more server computing devices. The process may include identifying first sensor data for a first vehicle having various systems and sensors. The first sensor data may have been captured by one or more sensors of the first vehicle as the vehicle is driven around. The first sensor data may include data points generated by one or more different types of sensors. In addition, the first sensor data may represent a finite point in time or timeframe, during which the first sensor data would have been captured or generated by the first vehicle's perception system. In addition, the first sensor data may be associated with a first location of the first vehicle at which or during the time when the first sensor data was captured. This location may be defined in both GPS coordinates as well as in a smooth coordinate system or a local frame.

Using the first location and the first timeframe for the first sensor data, a second vehicle associated with second sensor data for a second timeframe may be identified. In some instances, identifying the second vehicle may include looking for a vehicle having a location that is "nearby" or within a particular distance of the first location associated with the first sensor data during the first timeframe. The second sensor data may include data points generated by one or more sensors, bounding boxes, as well as one or more associated labels for objects detected by the vehicles perception system or another system which may have processed the sensor data in order to generate the bounding boxes and/or associated labels. The location of the labels for the second sensor data may be generated in the smooth coordinate system or local frame of the second vehicle.

In order to apply the labels from the first sensor data to the second sensor data, a conversion from the local frame of the second vehicle to the local frame of the first vehicle may be determined. The location of the labels may then be converted to the local frame coordinates of the first vehicle using the conversion. The converted labels and other labels of the second sensor data may then be transferred or otherwise associated with the first sensor data such that objects of the first sensor data are now labeled. In this regard, the objects detected by the first vehicle can be automatically labeled without requiring the first sensor data to be processed using object detection systems of the first vehicle or even human operators. These transferred labels for the first sensor data may then be stored and used for various purposes.

The features described herein may enable the automatic generation of highly-accurate three-dimensional labels for sensor data with very little costs in terms of time or processing power. A label from sensor data generated by a perception system of one vehicle may not necessarily be useful for another vehicle. However, by converting the location of that label from the local coordinate system for the one vehicle to the local coordinate system of the another vehicle, the label may become particularly useful for various types of purposes, including machine learning. In addition, by transferring labels generated by two vehicles with different positions and orientations, the sensor data from a first vehicle can be labeled for objects which may otherwise have not been detected by the first vehicle as they were beyond the first vehicle's perception range or occluded due to other objects or weather conditions. Further, in some situations labels generated by the first vehicle's perception system may have lower confidence values due to factors such as distance to the object or whether the object was partially occluded. In situations in which the second vehicle may have been closer to the object or have a better perspective view of that object, the labels generated by the second vehicle may have a higher confidence than labels generated by the first vehicle. Therefore, transferring the labels from the second vehicle to the sensor data generated by the first vehicle, may provide labels for the sensor data generated by the first vehicle that have higher confidence than the labels generated by the first vehicle.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks including tractor trailers and others, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

The computing devices 110 may also be connected to one or more speakers 112 as well as one or more user inputs 114. The speakers may enable the computing devices to provide audible messages and information, such as the alerts described herein, to occupants of the vehicle, including a driver. In some instances, the computing devices may be connected to one or more vibration devices configured to vibrate based on a signal from the computing devices in order to provide haptic feedback to the driver and/or any other occupants of the vehicle. As an example, a vibration device may consist of a vibration motor or one or more linear resonant actuators placed either below or behind one or more occupants of the vehicle, such as embedded into one or more seats of the vehicle.

The user input may include a button, touchscreen, or other devices that may enable an occupant of the vehicle, such as a driver, to provide input to the computing devices 110 as described herein. As an example, the button or an option on the touchscreen may be specifically designed to cause a transition from the autonomous driving mode to the manual driving mode or the semi autonomous driving mode.

In one aspect the computing devices 110 may be part of an autonomous control system capable of communicating with various components of the vehicle in order to control the vehicle in an autonomous driving mode. For example, returning to FIG. 1, the computing devices 110 may be in communication with various systems of vehicle 100, such as deceleration system 160, acceleration system 162, steering system 164, routing system 166, planning system 168, positioning system 170, and perception system 172 in order to control the movement, speed, etc. of vehicle 100 in accordance with the instructions 132 of memory 130 in the autonomous driving mode.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or tractor trailer, the steering system may include components to control the angle of wheels to turn the vehicle.

Planning system 168 may be used by computing devices 110 in order to determine and follow a route generated by a routing system 166 to a location. For instance, the routing system 166 may use map information to determine a route from a current location of the vehicle to a drop off location. The planning system 168 may periodically generate trajectories, or short-term plans for controlling the vehicle for some period of time into the future, in order to follow the route (a current route of the vehicle) to the destination. In this regard, the planning system 168, routing system 166, and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In addition, the map information may identify area types such as constructions zones, school zones, residential areas, parking lots, etc.

The map information may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Figure 2:
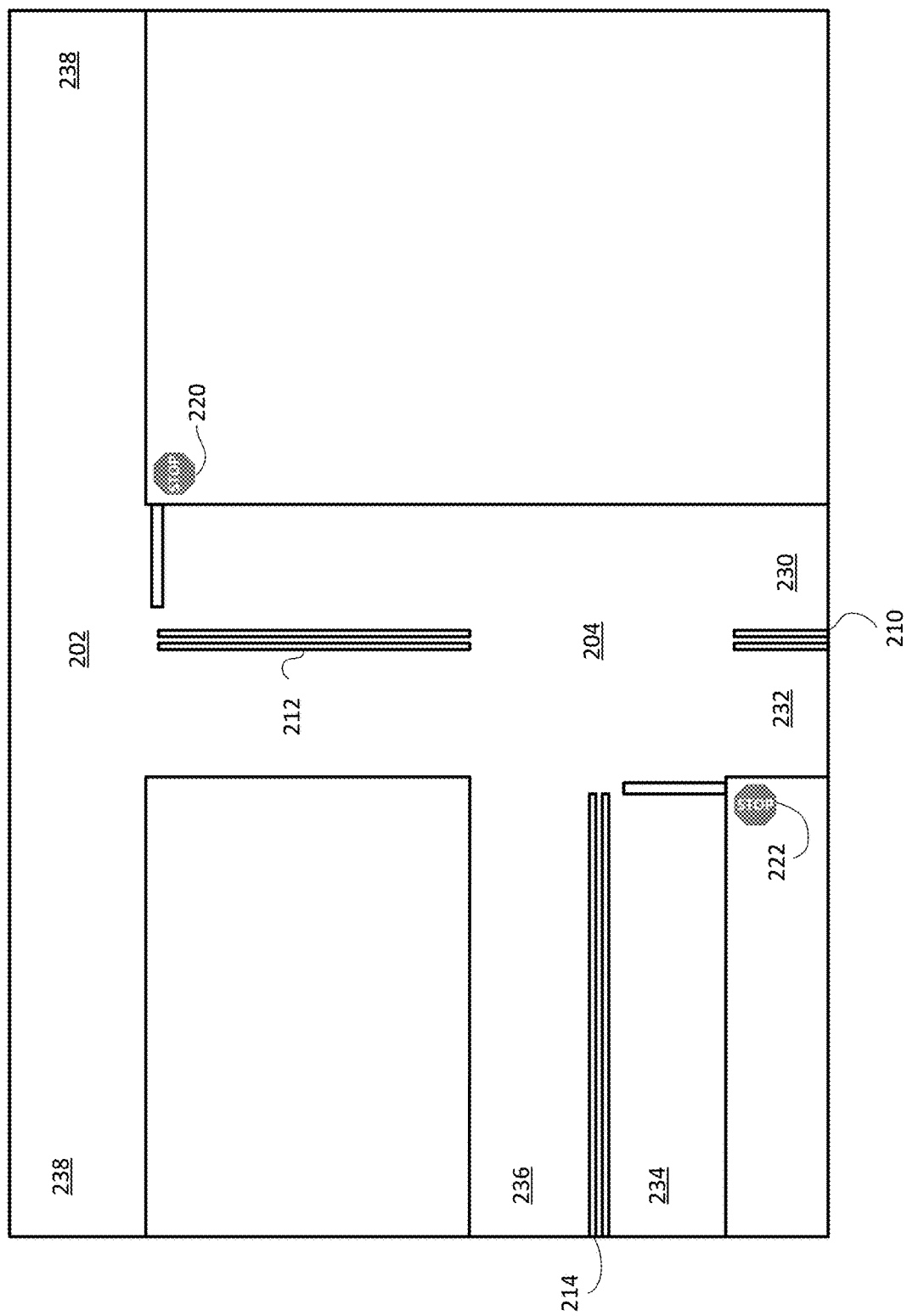
FIG. 2 is an example of map information in accordance with aspects of the disclosure.

FIG. 2 is an example of map information 200 for a section of roadway including intersections 202, 204. The map information 200 may be a local version of the map information stored in the memory 130 of the computing devices 110. Other versions of the map information 200 may also be stored in the storage system 450 discussed further below. In this example, the map information 200 includes information identifying the shape, location, and other characteristics of lane lines 210, 212, 214, stop signs 220, 222, and lanes 230, 232, 234, 236, 238.

While the map information is depicted herein as an image-based map, the map information need not be entirely image based (for example, raster). For example, the map information may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with the computing devices of the computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Figure 3:
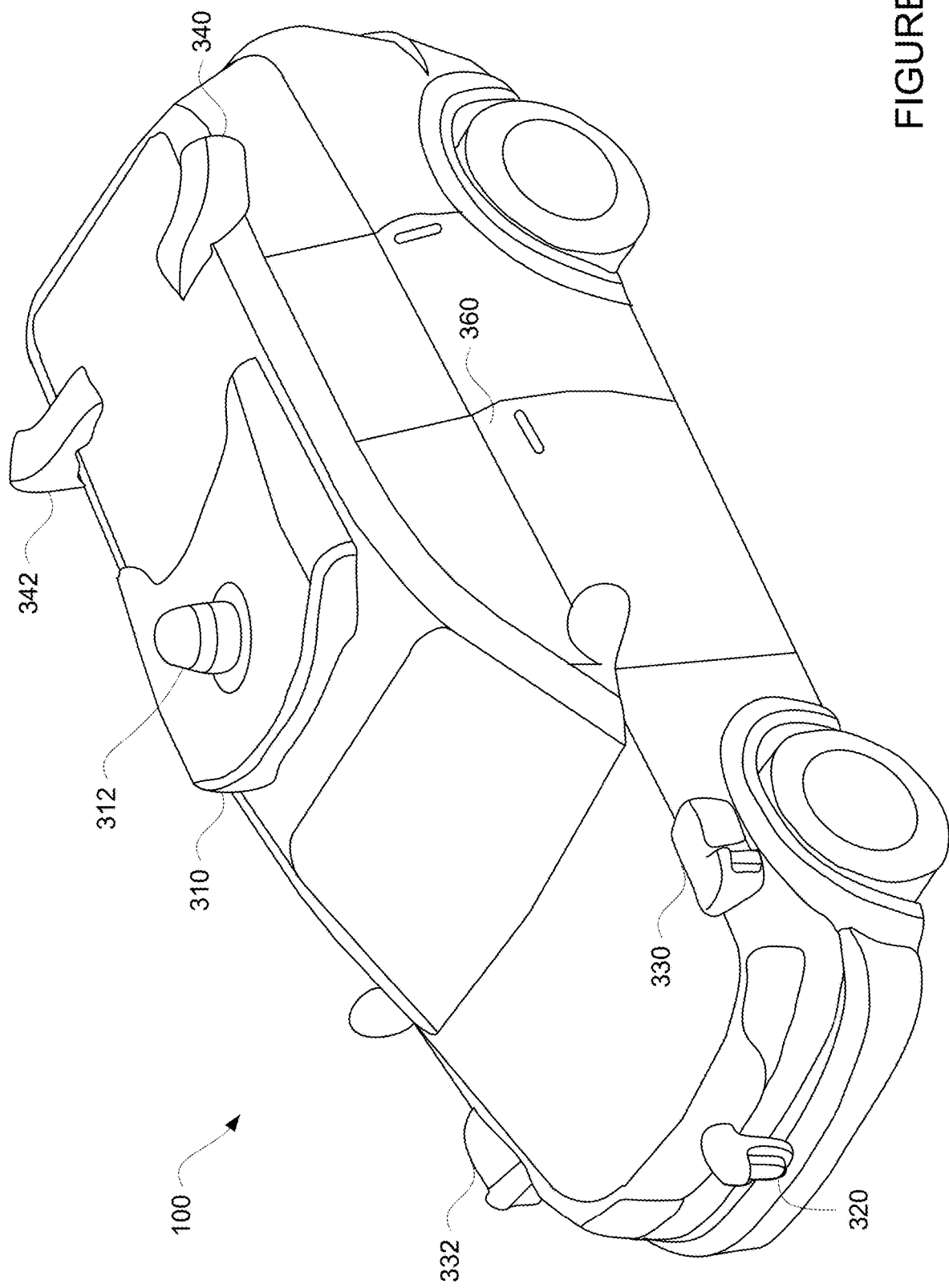
FIG. 3 is an example diagram of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by the computing devices of the computing devices 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The computing devices 110 may be capable of communicating with various components of the vehicle in order to control the movement of vehicle 100 according to primary vehicle control code of memory of the computing devices 110. For example, returning to FIG. 1, the computing devices 110 may include various computing devices in communication with various systems of vehicle 100, such as deceleration system 160, acceleration system 162, steering system 164, routing system 166, planning system 168, positioning system 170, perception system 172, and power system 174 (i.e. the vehicle's engine or motor) in order to control the movement, speed, etc. of vehicle 100 in accordance with the instructions 132 of memory 130.

The various systems of the vehicle may function using autonomous vehicle control software in order to determine how to and to control the vehicle. As an example, a perception system software module of the perception system 172 may use sensor data generated by one or more sensors of an autonomous vehicle, such as cameras, LIDAR sensors, radar units, sonar units, etc., to detect and identify objects and their features. These features may include location, type, heading, orientation, speed, acceleration, change in acceleration, size, shape, etc. In some instances, features may be input into a behavior prediction system software module which uses various behavior models based on object type to output a predicted future behavior for a detected object.

In other instances, the features may be put into one or more detection system software modules, such as a traffic light detection system software module configured to detect the states of known traffic signals, a school bus detection system software module configured to detect school busses, construction zone detection system software module configured to detect construction zones, a detection system software module configured to detect one or more persons (e.g. pedestrians) directing traffic, a traffic accident detection system software module configured to detect a traffic accident, an emergency vehicle detection system configured to detect emergency vehicles, etc. Each of these detection system software modules may input sensor data generated by the perception system 172 and/or one or more sensors (and in some instances, map information for an area around the vehicle) into various models which may output a likelihood of a certain traffic light state, a likelihood of an object being a school bus, an area of a construction zone, a likelihood of an object being a person directing traffic, an area of a traffic accident, a likelihood of an object being an emergency vehicle, etc., respectively.

Detected objects, predicted future behaviors, various likelihoods from detection system software modules, the map information identifying the vehicle's environment, position information from the positioning system 170 identifying the location and orientation of the vehicle, a destination for the vehicle as well as feedback from various other systems of the vehicle may be input into a planning system software module of the planning system 168. The planning system may use this input to generate trajectories for the vehicle to follow for some brief period of time into the future based on a current route of the vehicle generated by a routing module of the routing system 166. A control system software module of the computing devices 110 may be configured to control movement of the vehicle, for instance by controlling braking, acceleration and steering of the vehicle, in order to follow a trajectory.

The computing devices 110 may control the vehicle in an autonomous driving mode by controlling various components. For instance, by way of example, the computing devices 110 may navigate the vehicle to a destination location completely autonomously using data from the detailed map information and planning system 168. The computing devices 110 may use the positioning system 170 to determine the vehicle's location and perception system 172 to detect and respond to objects when needed to reach the location safely. Again, in order to do so, computing device 110 may generate trajectories and cause the vehicle to follow these trajectories, for instance, by causing the vehicle to accelerate (e.g., by supplying fuel or other energy to the engine or power system 174 by acceleration system 162), decelerate (e.g., by decreasing the fuel supplied to the engine or power system 174, changing gears, and/or by applying brakes by deceleration system 160), change direction (e.g., by turning the front or rear wheels of vehicle 100 by steering system 164), and signal such changes (e.g. by using turn signals). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
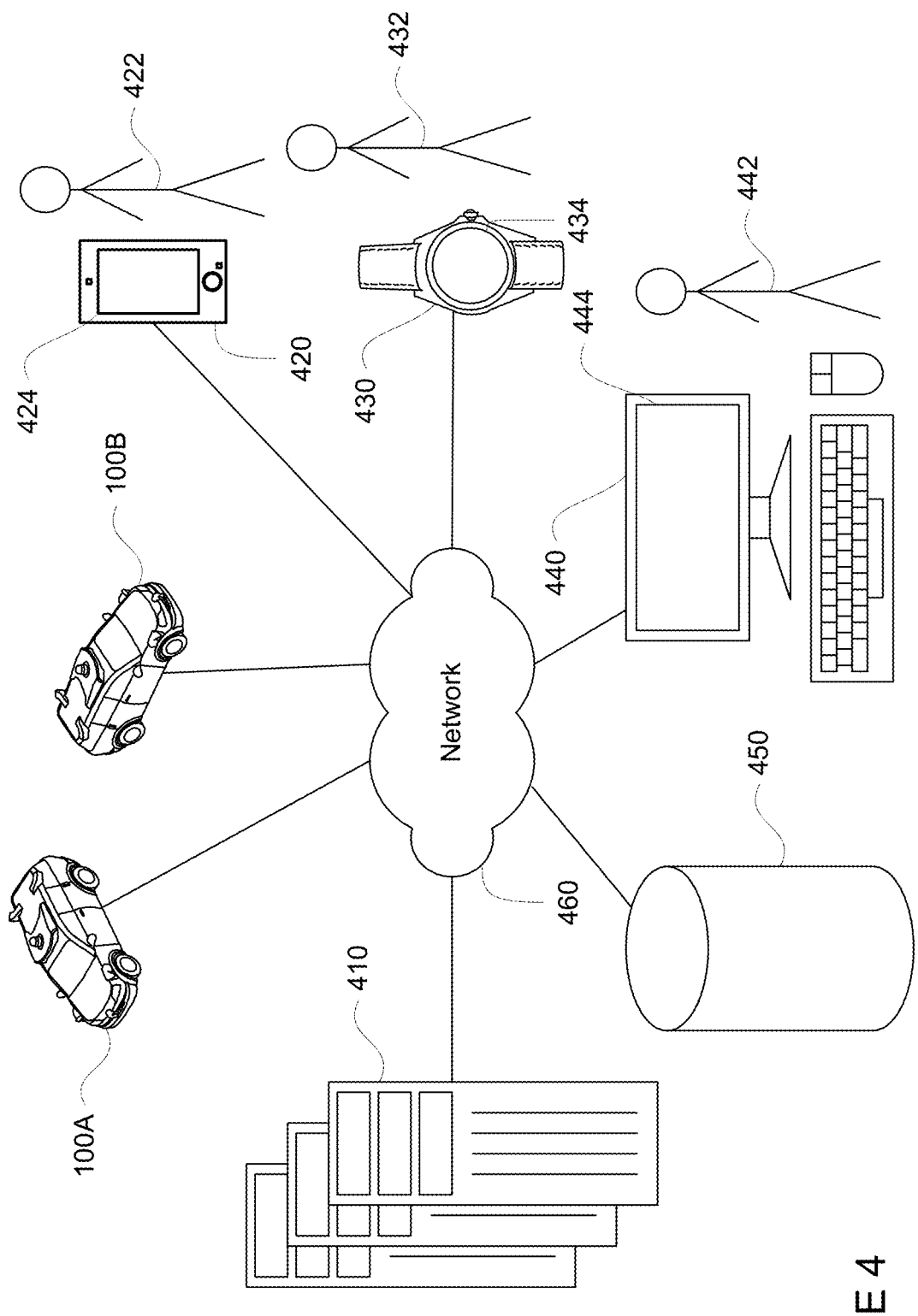
FIG. 4 is an example pictorial diagram of a system in accordance with aspects of the disclosure.
Figure 5:
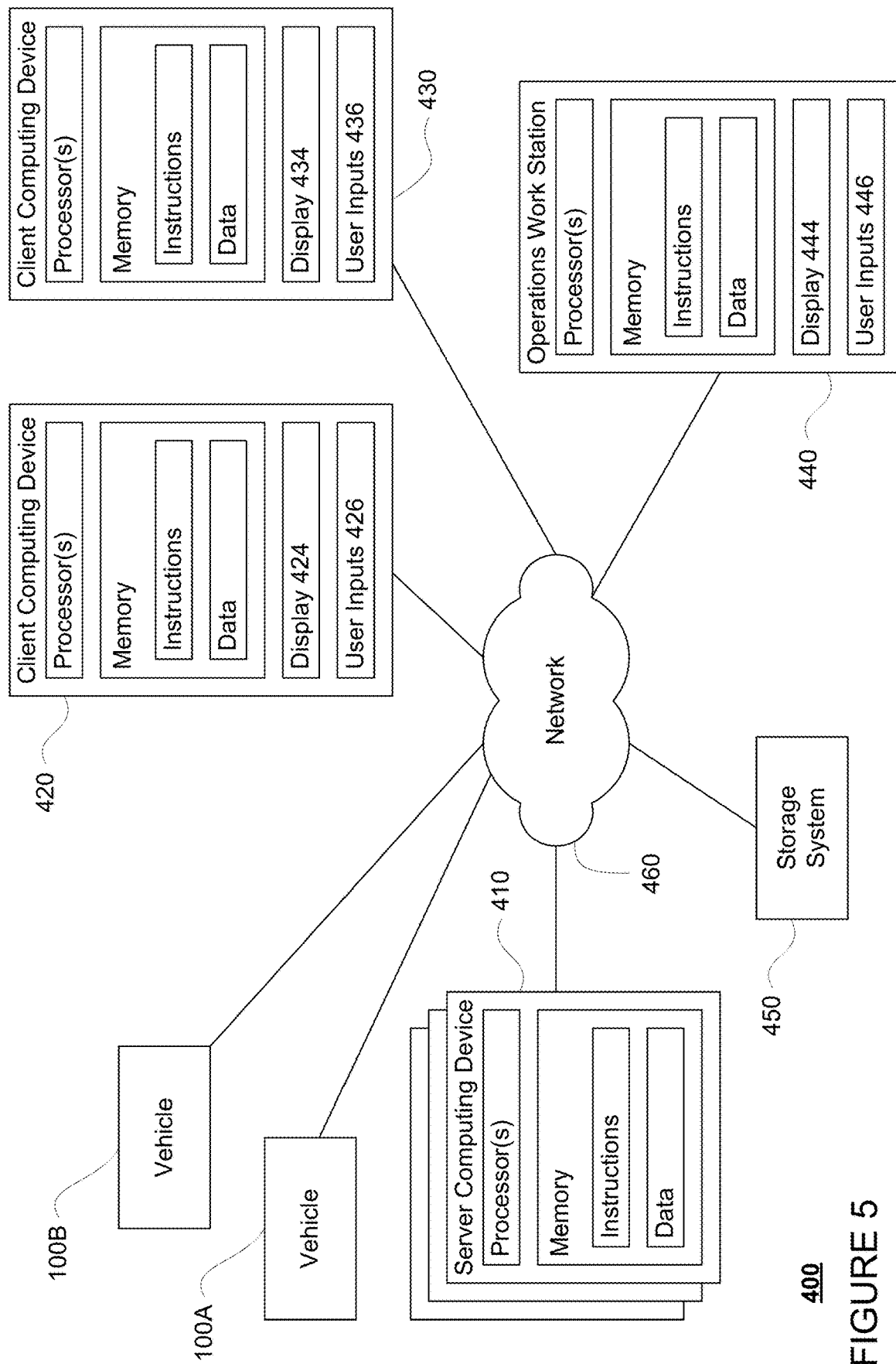
FIG. 5 is an example functional diagram of a system in accordance with aspects of the disclosure.

Computing device 110 of vehicle 100 may also receive or transfer information to and from other computing devices, for instance via wireless network connections 150 (e.g. WiFi, cellular, etc.), such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicles 100A, 100B which may be configured the same as or similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 134, and instructions 132 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A as well as computing devices 420, 430, 440 via the network 460. For example, vehicles 100, 100A, may be a part of a fleet of vehicles that can be dispatched by server computing devices to various locations. In this regard, the server computing devices 410 may function as a validation computing system which can be used to validate autonomous control software which vehicles such as vehicle 100 and vehicle 100A may use to operate in an autonomous driving mode. In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

In some examples, client computing device 440 may be an operations workstation used by an administrator or operator to review scenario outcomes, handover times, and validation information as discussed further below. Although only a single operations workstation 440 is shown in FIGS. 4 and 5, any number of such work stations may be included in a typical system. Moreover, although operations work station is depicted as a desktop computer, operations works stations may include various types of personal computing devices such as laptops, netbooks, tablet computers, etc.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices 410, in order to perform some or all of the features described herein. For instance, storage system 450 may store sensor data. This sensor data may include, for instance, sensor data generated by various sensors of a perception system, such as perception system 172 of vehicle 100, vehicle 100A, 100B, etc. As an example, the sensor data may include raw sensor data as well as one or more labels identifying defining characteristics of perceived objects such as bounding boxes, shape, location, orientation, speed, etc. of objects such as vehicles, pedestrians, bicyclists, vegetation, curbs, lane lines, sidewalks, crosswalks, buildings, etc. The sensor data may also include information identifying the location and timeframe during or point in time at which the sensor data was captured.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 18:
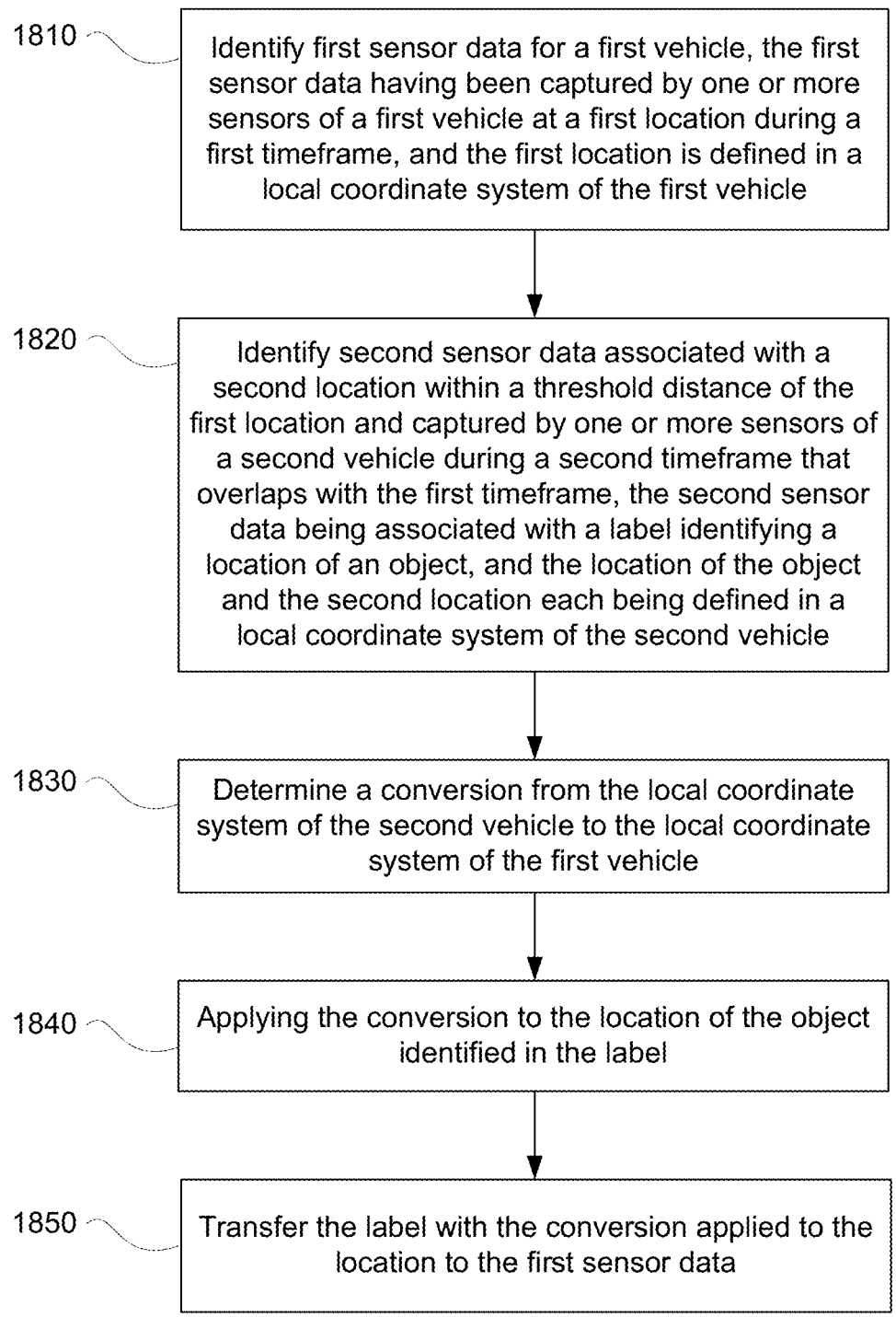
FIG. 18 is an example flow diagram in accordance with aspects of the disclosure.

FIG. 18 includes an example flow diagram 1800 of some of the examples for automatically generating labels for sensor data, which may be performed by one or more processors such as processors of computing devices 410. For instance, at block 1810, first sensor data for a first vehicle is identified. This first sensor data was captured by one or more sensors of a first vehicle at a first location during a first timeframe, and the first location is defined in both a global coordinate system and a local coordinate system for the first vehicle.

In this regard, automatically generating labels may involve an offline process using one or more server computing devices 410. The process may include identifying first sensor data for a first vehicle having various systems and sensors, such as vehicle 100A and the sensors and system described above. The first sensor data may have been captured by one or more sensors of the vehicle 100A as the vehicle 100A is driven around. In this regard, in some instances, the first vehicle may be an autonomous vehicle and the first sensor data may have been captured while the autonomous vehicle is driven in an autonomous driving mode, though this is not necessary.

Figure 6:
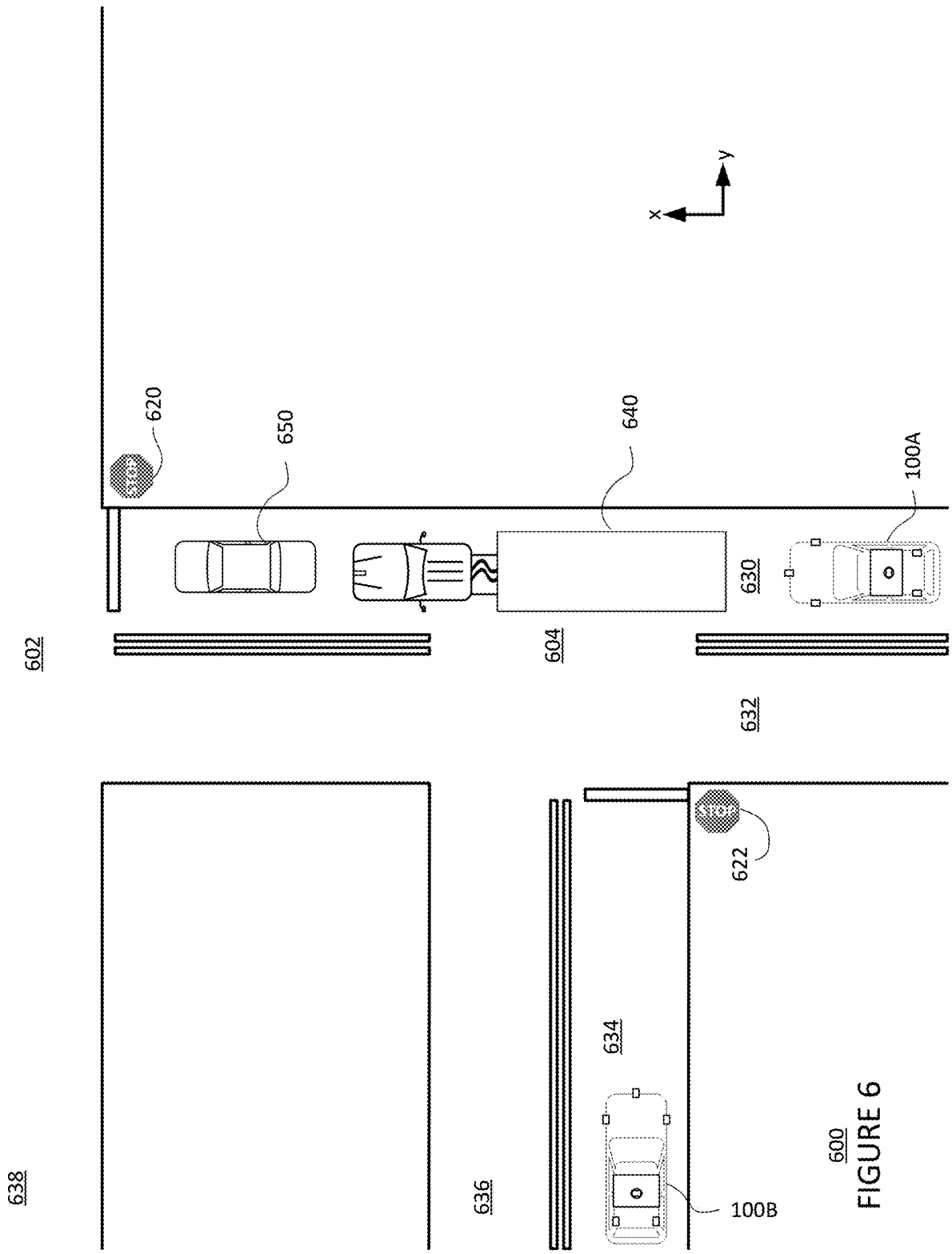
FIG. 6 is an example of a section of roadway and vehicles in accordance with aspects of the disclosure.

FIG. 6 is an example of an area of roadway 600 corresponding to the area of the map information 200. In this regard, intersections 602, 604 correspond to the shape and area of intersections 202, 204, stop signs 620, 622 correspond to the shape and location of stop signs 220, 222, lanes 630, 632, 634, 636, 638 correspond to the shape and location of lanes 230, 232, 234, 236, 238, and so on. In this example, a first vehicle or vehicle 100A is approaching intersection 604 from lane 630. In this example, a second vehicle or vehicle 100B is approaching intersection 604 in lane 634. Two other vehicles are also in the area of roadway 600; tractor trailer 640 which is in intersection 604 and approaching intersection 602 as well as car 650 which is in lane 630 approaching intersection 602.

The first sensor data may include data points generated by one or more different types of sensors, such as camera images, LIDAR data points, radar data points, sonar data points, audio files (collected via a microphone) etc. The first sensor data may represent a finite point in time or timeframe, such as 100 ms or more or less, during which the first sensor data would have been captured or generated by the vehicle's perception system. For example, the first sensor data may include data generated during a single spin of laser-based (e.g. LIDAR) sensor which rotates 360 degrees. In this regard, the first sensor data may be associated with timeframe during which the first sensor data was captured and/or generated. The timeframe may be determined using GPS timing signals. The first sensor data may or may not include bounding boxes and/or one or more labels for objects represented in the first sensor data.

Figure 7:
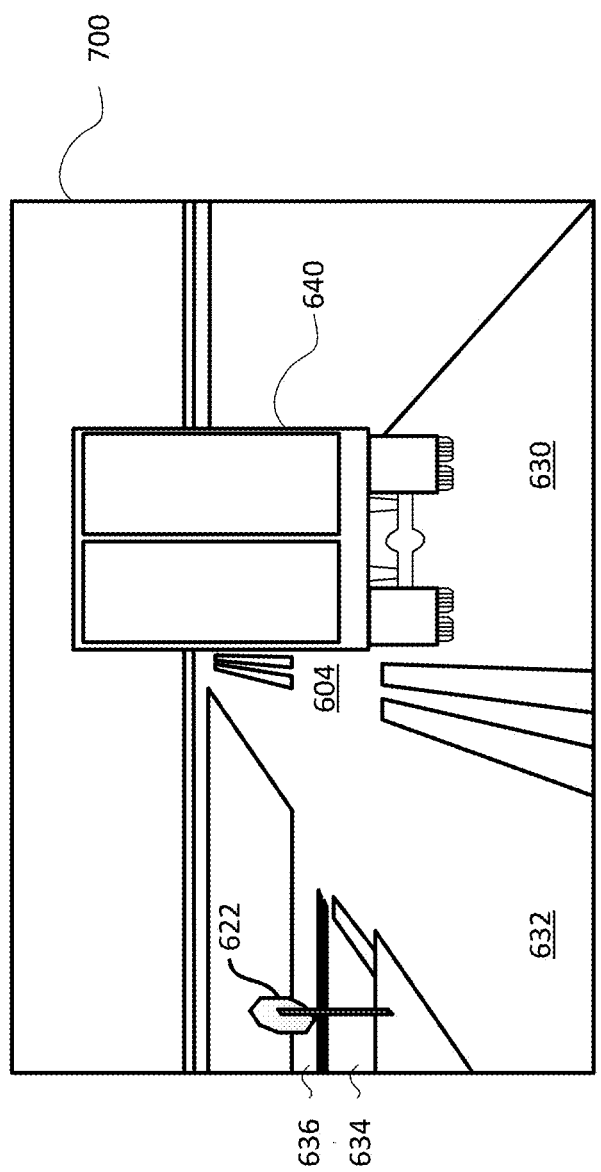
FIG. 7 is an example image in accordance with aspects of the disclosure.

FIG. 7 is an example of first sensor data including a camera image 700 which may have been captured by a perception system of vehicle 100A at the point in time or during the timeframe of the example of FIG. 6. For ease of understanding, the features of FIG. 6 are referenced in FIG. 7, such as intersection 604 lanes 630, 632, 634, 636, stop sign 620, tractor trailer 640, though camera image 700 would not actually include such references. At some point, the first sensor data, including the camera image 700, may be transferred from the vehicle 100A to the storage system 450, for instance, by uploading over a wireless connection or by using a wired connection.

In addition, the first sensor data may be associated with a first location of the first vehicle at which or during the time when the first sensor data was captured. This location may be defined in both GPS coordinates (e.g. latitude, longitude, altitude) as well as in a smooth coordinate system or a local frame. Of course, the location information may also be much more complex, and may include additional information such as wheel odometry and matching laser data to a prior 3D map, etc. This local frame may be established each time the first vehicle is turned on and/or the autonomous driving mode is activated. In this regard, the local frame may be a Euclidean coordinate system where the origin of the local frame may be the location of the first vehicle at the time when the vehicle was last turned on and where positive x direction corresponds to East, positive y direction corresponds to North, and the z dimension corresponds to the vehicle's elevation.

Figure 8:
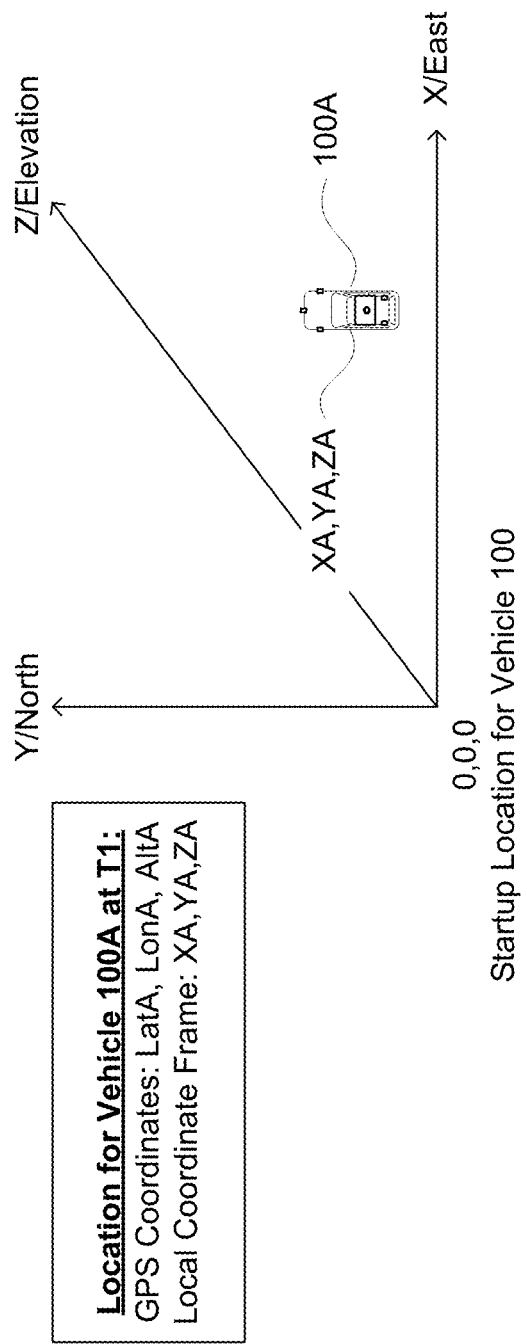
FIG. 8 is an example of location information in accordance with aspects of the disclosure.

FIG. 8 provides a visual representation of the first location of vehicle 100A at the point in time or timeframe during which the camera image 700 was captured. In this regard, the camera image 700 may be associated with both a GPS location defined in GPS coordinates for latitude, longitude, and altitude as well as a local coordinate frame including x, y, and z coordinates where positive x direction corresponds to East, positive y direction corresponds to North, and the z dimension corresponds to the vehicle's elevation. This local coordinate frame has its origin at the location of vehicle 100A at the startup location for Vehicle 100A (i.e. the location of Vehicle 100A when the vehicle 100A and/or the vehicle's computing devices were last turned on).

Returning to FIG. 18, at block 1820, a second vehicle is identified based on a second location of the second vehicle within a threshold distance of the first vehicle within the first timeframe. The second vehicle is associated with second sensor data captured by one or more sensors of the second vehicle at the second location during a second timeframe that overlaps with the first timeframe, and the second sensor data is associated with a label identifying a location of an object. The location of the object is defined in a local coordinate system of the second vehicle, and the second location is defined in both the global coordinate system and the local coordinate system;

Using the first location and the first timeframe for the first sensor data, a second vehicle associated with second sensor data for a second timeframe may be identified. For instance, locations of a plurality of different vehicles and sensor data generated by those vehicles during the timeframe may be known. In this regard, the first timeframe and second timeframe may overlap with one another. In addition, for consistency across different vehicles the timeframes may be synced using GPS timing signals. Regarding the locations, each vehicle of the plurality of vehicles may periodically report its current location or alternatively, first sensor data stored in the storage system 450 may be associated with a location of the vehicle which captured the first sensor data.

In some instances, identifying the second vehicle may include looking for a vehicle having a location that is "nearby" or within a particular distance of the first location associated with the first sensor data during the first timeframe. This particular distance may be based on a type of labels to be generated. In other words, referring to the example of FIG. 6, using the location and timeframe associated with the camera image 700, one or more nearby vehicles, such as vehicle 100B may be identified. As one example, labels may be needed for objects that are beyond a sensor range for a given sensor or for any sensor data within a given radius around the first vehicle, such as 100 meters, 300 meters or more or less. This may be especially useful in order to find labels at distances from the vehicle where sensor data from a long-range LIDAR sensor is considered unreliable. In some instances, labels may be needed for a particular angular region relative to the first vehicle, e.g. a range of plus or minus 30 degrees from a particular sensor or point on the first vehicle. As noted below, these instances of nearby vehicles may be found opportunistically or can be actively created by intentionally driving vehicles in proximity to one another (e.g. passively or in a particular formation).

The second sensor data may include data points generated by one or more sensors (e.g. LIDAR, radar, sonar, camera, microphone, etc.), bounding boxes, as well as one or more associated labels for objects detected by the vehicles perception system or another system which may have processed the sensor data in order to generate the bounding boxes and/or associated labels. The bounding boxes may represent a three-dimensional space that includes all of the data points generated by a given sensor corresponding to an object. The labels may identify information about each object such as its location, orientation, heading, speed, rate of acceleration, rate of deceleration, type (e.g. vehicle, bicyclist, pedestrian, construction object, etc.), timestamp, as well as other information such as turn signals states (e.g. on or off, left or right, etc.), body pose, door open, gaze direction (of a driver, passenger, pedestrian, bicyclist, etc.), hand gesture classifications, whether a light is flashing, etc. where applicable. Again, this timestamp may be generated using GPS data. In addition, each of these labels may be associated with a confidence value indicating how confident the label is considered to be (i.e. how accurate).

Figure 9:
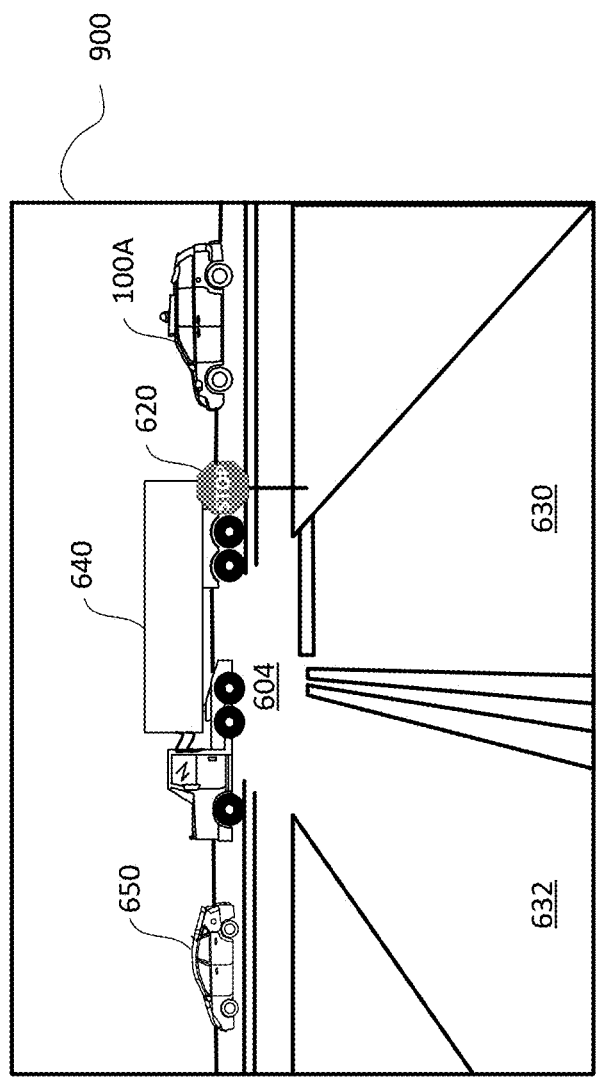
FIG. 9 is an example image in accordance with aspects of the disclosure.
Figure 10:
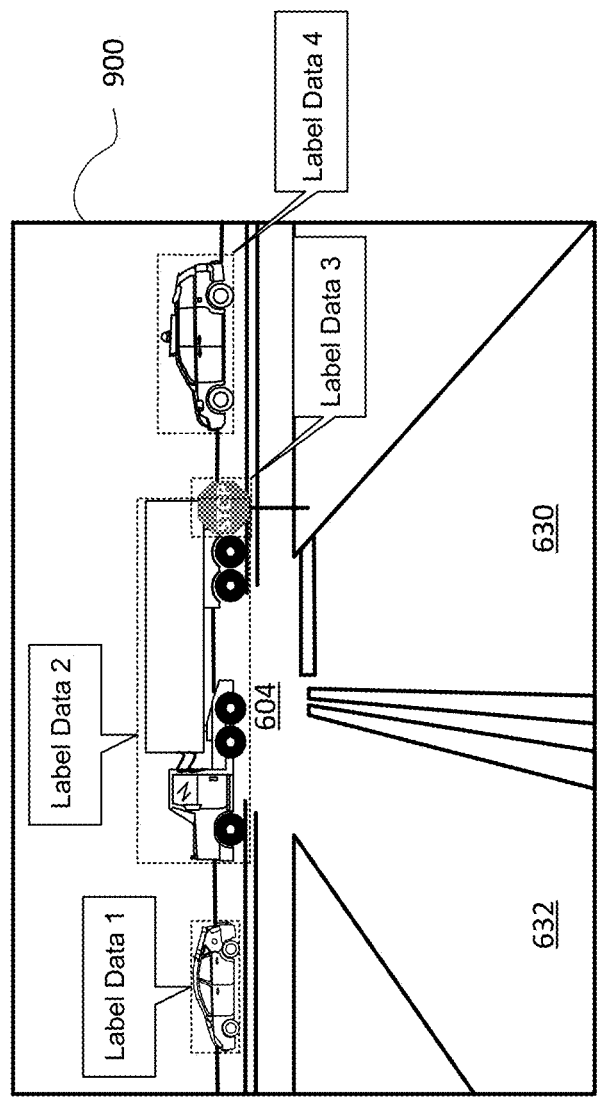
FIG. 10 is an example image with labels in accordance with aspects of the disclosure.

FIG. 9 is an example of first sensor data including a camera image 900 which may have been captured by a perception system of vehicle 100A at the point in time or during the timeframe of the example of FIG. 6. For ease of understanding, the features of FIG. 6 are referenced in FIG. 9, such as intersection 604 lanes 630, 632, stop sign 620, tractor trailer 640, car 650, though camera image 900 would not actually include such references. FIG. 10 depicts camera image 900 including labels identified as label data 1 for car 650, label data 2 for tractor trailer 640, label data 3 for vehicle 100A, and label data 4 for stop sign 620. The label data 1, 2, 3, 4 may each include a location and/or bounding box (represented by dashed-lines) for the respective label as well as other information about the objects identified by the label data (not shown) such as described above. As with the first sensor data at some point, the second sensor data including the camera image 900 may be transferred from the vehicle 100B to the storage system 450, for instance, by uploading over a wireless connection or by using a wired connection.

The locations of the labels for the second sensor data may be generated in the smooth coordinate system or local frame of the second vehicle. As in the example above, this local frame may be established each time the first vehicle is turned on and/or the autonomous driving mode is activated. In this regard, as described above, the local frame may be a Euclidean coordinate system where the origin of the local frame may be the location of the vehicle at the time when the vehicle was last turned on and where positive x direction corresponds to East, positive y direction corresponds to North. The z dimension thus corresponds to the vehicle's elevation.

Figure 11:
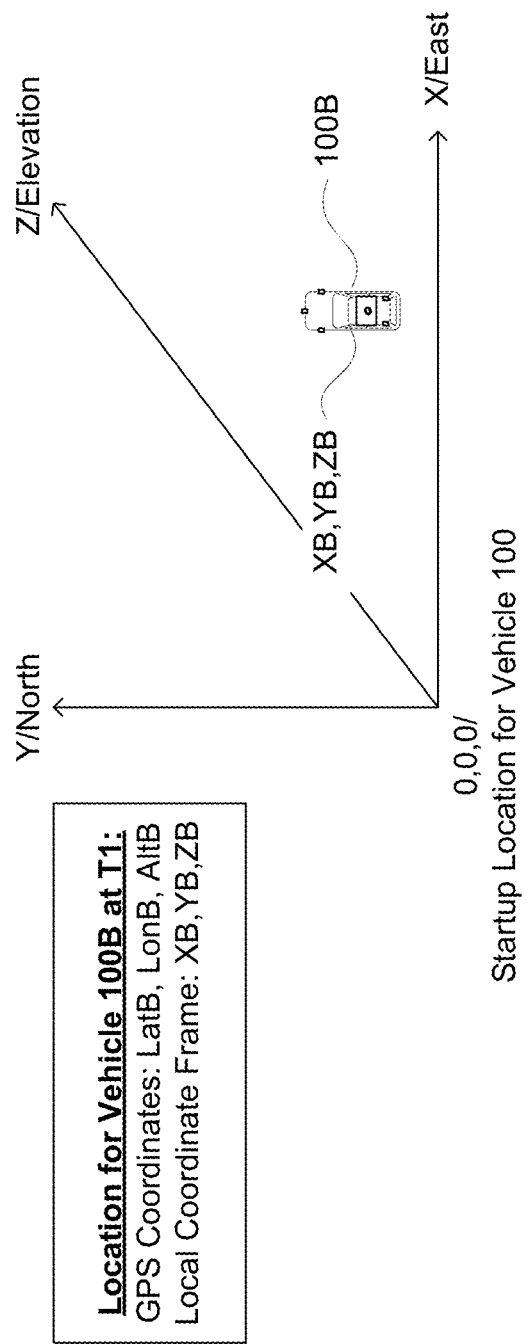
FIG. 11 is an example of location information in accordance with aspects of the disclosure.

FIG. 11 provides a visual representation of the first location of vehicle 100B at the point in time or timeframe during which the camera image 900 was captured. In this regard, the camera image 900 may be associated with both a GPS location defined in GPS coordinates for latitude, longitude, and altitude as well as a local coordinate frame including x, y, and z coordinates where positive x direction corresponds to East, positive y direction corresponds to North, and the z dimension corresponds to the vehicle's elevation. This local coordinate frame has its origin at the location of vehicle 100B at the startup location for Vehicle 100B (i.e. the location of Vehicle 100B when the vehicle 100B and/or the vehicle's computing devices were last turned on).

Returning to FIG. 18 at block 1830, a conversion from the local coordinate system of the second vehicle to the local coordinate system of the first vehicle is determined. Thereafter at block 1840, the conversion is applied to the location of the object identified in the label. In order to apply the labels from the first sensor data to the second sensor data, a conversion from the local frame of the second vehicle to the local frame of the first vehicle may be determined. In one example, conversion may be determined by determining a difference between the GPS coordinates of the origin of the local frame of the first vehicle and the GPS coordinates of the origin of the local frame of the second vehicle. The GPS coordinates of the origin of the local frame of the first vehicle may be determined from the first location as defined in both GPS coordinates and the local frame of the first vehicle. Similarly, the GPS coordinates of the origin of the local frame of the second vehicle may be determined from the second location as defined in both GPS coordinates and the local frame of the second vehicle. Alternatively, a registration approach may be used to try to find a rigid transform that aligns the first and second sensor data at once. This may also correct for any errors in the estimated positions and/or orientations of the two vehicles. The location of the labels may then be converted to the local frame coordinates of the first vehicle using the conversion. For instance, the difference may be subtracted from each of the labels resulting in labels which are now in the local frame coordinates of the first vehicle.

Figure 12:
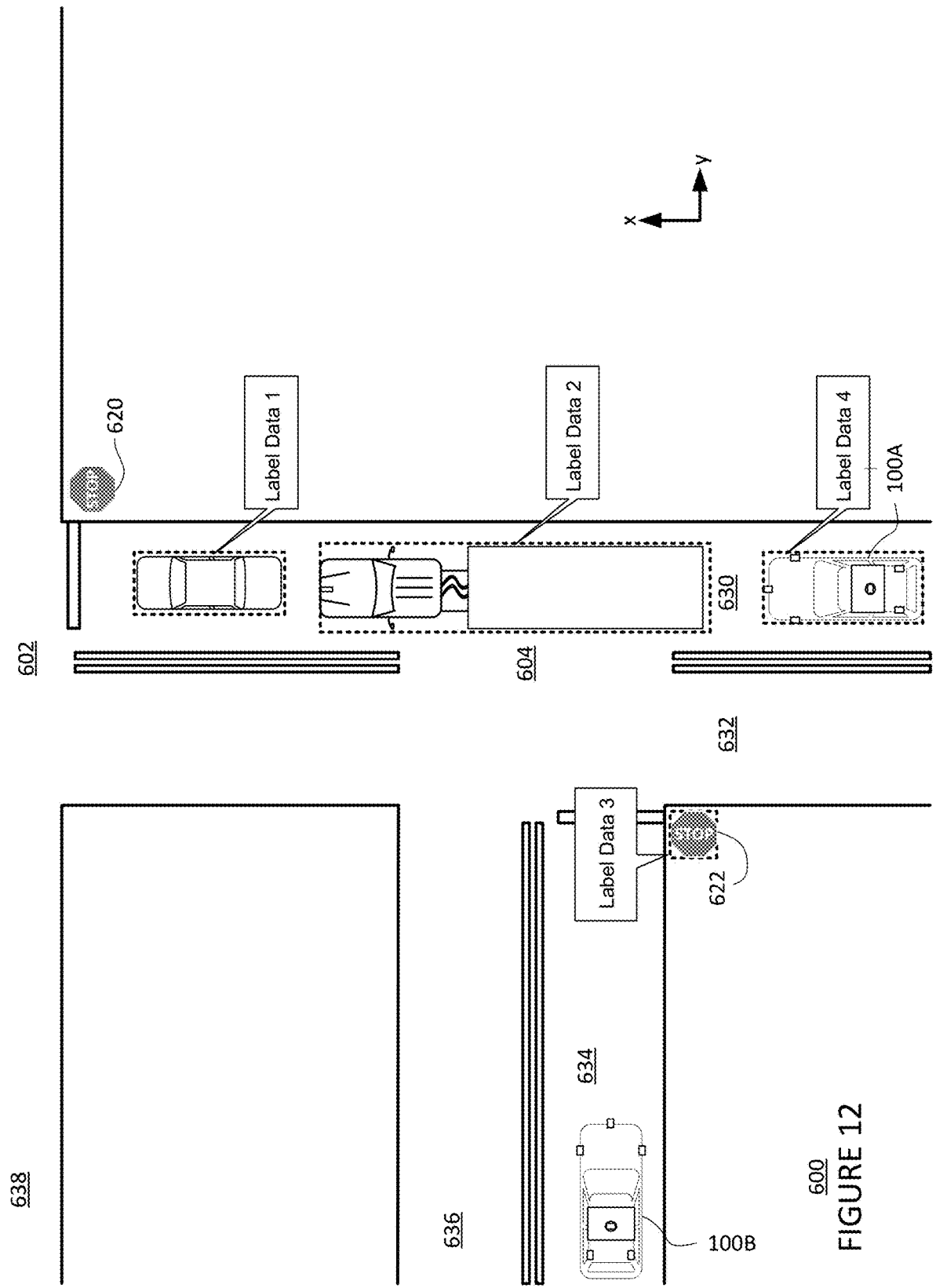
FIG. 12 is an example of a section of roadway, vehicles and labels in accordance with aspects of the disclosure.

Returning to FIG. 18, at block 1850, the label with the conversion applied to the location is transferred to the first sensor data. The converted labels and other labels of the second sensor data may then be transferred or otherwise associated with the first sensor data such that objects of the first sensor data are now labeled. FIG. 12 provides an example representation of the area of roadway 600 with the label data 1, label data 2, label data 3, label data 4 depicted with respect to each of vehicle 100A, tractor trailer 640, car 650, and stop sign 620 for ease of understanding. Such a representation may be made possible by determining a conversion between the local frame of FIG. 11 to the local frame of FIG. 8 and applying the conversion to the label data 1, 2, 3, 4. In addition, labels may be automatically generated for camera image 700 from labels associated with camera image 800.

Figure 13:
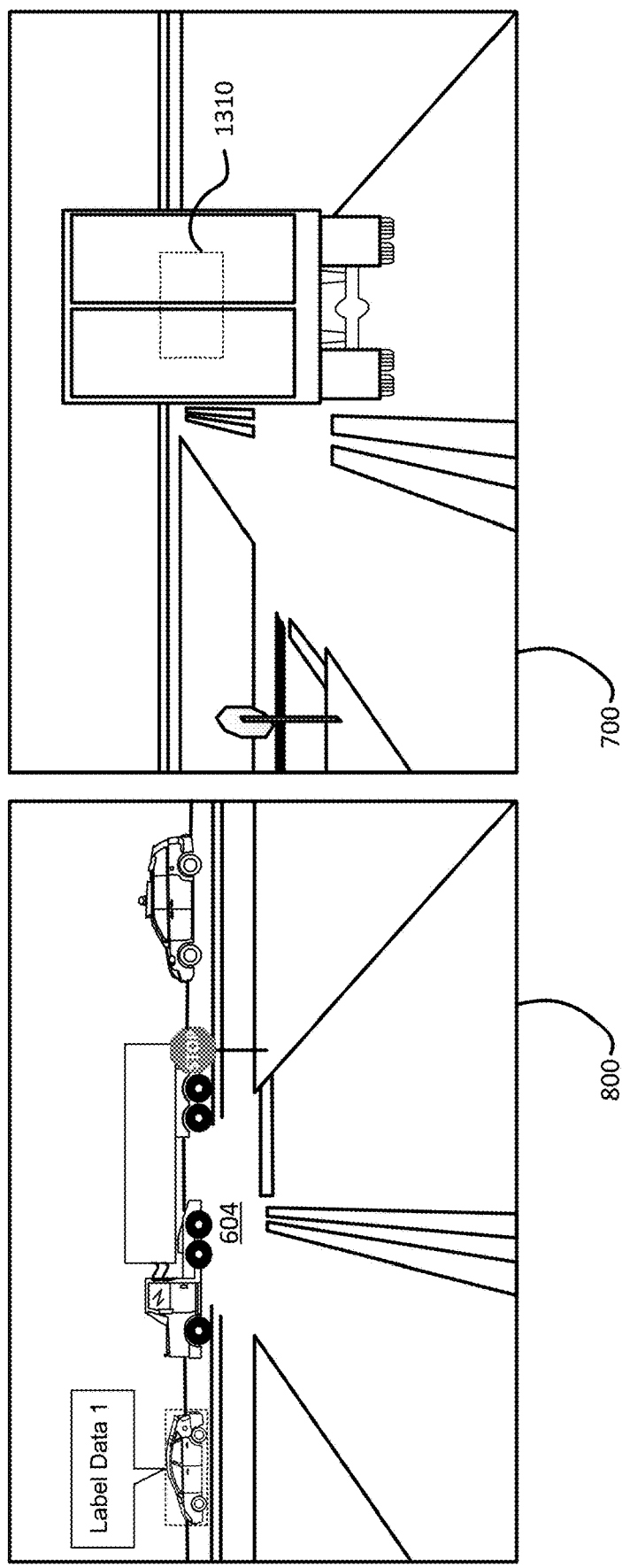
FIG. 13 is an example of a comparison of images in accordance with aspects of the disclosure.
Figure 14:
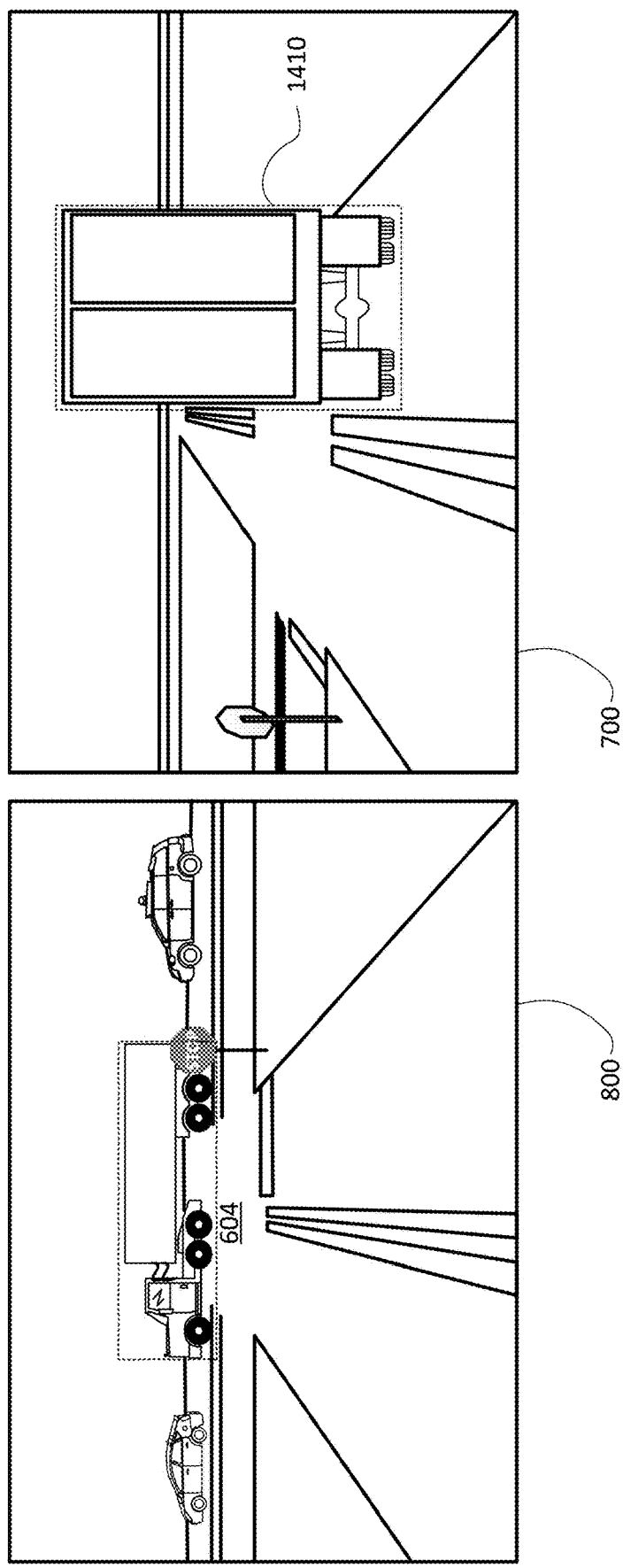
FIG. 14 is an example of a comparison of images in accordance with aspects of the disclosure.

For instance, FIG. 13 depicts camera image 700 and camera image 800. In this example, label data 1 is transferred to camera image 700 by applying a conversion to the label data 1 in order to generate a new label including a bounding box (represented by dashed line area 1310) for the car 650. For instance, FIG. 14 depicts camera image 700 and camera image 800. In this example, label data 2 is transferred to camera image 700 by applying a conversion to the label data 2 in order to generate a new label including a bounding box (represented by dashed line area 1410) for the tractor trailer 640.

In this regard, "transferring" may actually refer to generating a new label and applying that label to the first sensor data. In this regard, the objects detected by the first vehicle can be automatically labeled without requiring the first sensor data to be processed using object detection systems of the first vehicle or even human operators. These transferred labels for the first sensor data may then be stored and used for various purposes.

In one example, transferred labels may be used to estimate accuracy of labels. For instance, the human operator may be asked to label sensor data from two nearby vehicles one at a time (e.g. label the first sensor data and the second sensor data). The human operator applied labels from one vehicle may then be transferred to the sensor data for the other vehicle. Any disparities between the directly applied labels and the transferred labels may be determined. In situations in which the localization accuracy is perfect, the only source of error would be from the human operator. Conversely, assuming the accuracy of labels applied by a human operator to be perfect allows measurement of the error in the vehicles' localization and could even be used to provide pose constraints for map information used to localize and control the vehicle in the autonomous driving mode and to thereby improve quality of the map information.

As another example, labels generated by the perception system of the first vehicle can be compared to the transferred labels from the second vehicle. Any disparities can be used to compare the perception systems of the two vehicles. This may be especially useful in situations in which the first and second vehicle are using different sensors and/or in situations in which the first and second vehicles are using different perception system software versions.

In still other examples, the transferred labels may be used to train neural networks and other models. For instance, in some instances, there may be labels for well beyond the maximum perceptive range for a particular sensor, such as a LIDAR sensor. In such cases, models may be trained and evaluate the perception system of the first vehicle which may use data from other types of sensors (such as cameras and radar) to infer the presence of objects beyond the maximum perceptive range for the particular sensor. In addition, this maximum perceptive range can be reduced in certain situations, such as in bad weather where there is fog, snow, rain, etc., and the ability to obtain labels in such conditions even at more reasonable ranges especially useful. In addition, having additional labels with additional details about various objects may be used to improve the accuracy of such models and thereby reduce false positives (detection of an object that does not exist) as well as false negatives (failure to detect an object when one exists).

Further, given the possibility of different perspectives of the same object by different vehicles at the same time, the transferred labels may provide additional information not otherwise obtainable (or obtainable to a particular accuracy) by the perception system of the first vehicle. For instance, if the first vehicle is directly behind a tractor trailer, the first vehicle may be unable to determine a length of the tractor trailer. But if the second vehicle is able to view the tractor trailer from the side, the second vehicle's perception system may determine a length of the tractor trailer. As such, the transferred label may provide the first sensor data with information about the length of the tractor trailer even where it would not have been possible to estimate otherwise. In addition, in situations where labels are transferred from a plurality of different sensor data to the first sensor data, the labels could be combined with one another (e.g. averaged) in order to get a high-quality, more accurate label.

In some instances, the timeframe of the sensor data may not be based on GPS timing signals. For example, the "clock" of the sensor data may be started when the vehicle was last turned on. In this regard, the timestamps of the labels may also need to be converted. This may be achieved by using GPS timing signals stored with the sensor data and determining a similar timing conversion as with the spatial coordinate conversions described above. This may be estimated, for example, by comparing each vehicle's GPS sensor timestamps to its local vehicle clock to find a timestamp offset; or by a registration procedure of the two vehicles' sensor data to find the timestamp offset that minimizes the registration error. The timing conversion may then be applied to the second labels, and thereafter the second labels may be transferred to the first sensor data.

In other instances, if there is some error in the estimation of East and North at the time when a vehicle is turned on, a conversion of the orientations of the labels may also need to be determined and applied. Of course, if there is very little or no error expected, such conversions may not be necessary given the correspondence between the y direction and North/South and the x direction and East/West in the local frames.

Certain of the objects of the transferred labels may actually be occluded with respect to the first vehicle's perception system when the first vehicle is at the first location. In some instances, the labels associated with occluded objects may be filtered. The filtering may be performed based on depth estimation, e.g. is the location for the object beyond the field of view of the first vehicle's perception system. As another example, the filtering may be performed by determining whether one object closer to the vehicle would fully or partially occlude another object or rather, a line of sight-type analysis.

In addition or alternatively, a human operator may review images of the sensor data to confirm and/or identify whether any of the labeled objects of the first sensor data are occluded. For instance, a portion of the first sensor data may be displayed at the same time as a portion of the second sensor data. For example, returning to FIGS. 13 and 14, the camera images 700 and 800 may be displayed to a human operator on a display of a computing device such as operations workstation 440.

A 3D bounding box for a label of the second sensor data may be projected into the 2D space of the second sensor data. In this regard, the dashed line area 1310 may correspond to a projected bounding box for the label data 1. The human operator may then be asked to identify whether the object that appears in the first sensor data also appears in the second sensor data and vice versa. If not, the object for the bounding box may be flagged or otherwise associated with a label identifying the object as occluded, not occluded, visible, not visible, etc. In this regard, in the example of FIG. 13 where the car 650 of the label data 1 is not visible in the camera image 700 as the car 650 is occluded by tractor trailer 640, the object for the bounding box represented by dashed line area 1310, may be flagged or otherwise associated with a label identifying the car 650 as occluded, not visible, etc. In contrast, turning to the example of FIG. 14, where the tractor trailer 640 of the label data 2 is visible in the camera image 700, the object for the bounding box represented by dashed line area 1410 may be flagged or otherwise associated with a label identifying the tractor trailer 650 as visible, not occluded, etc. This may enable occluded objects to be filtered for some purposes and retrieved for other purposes. In some instances, the human operator may also be able to correct errors in one or both labels (e.g. change dimensions, etc.). Alternatively, rather than using a human operator, a neural network may be trained to perform similar functions.

Figure 15:
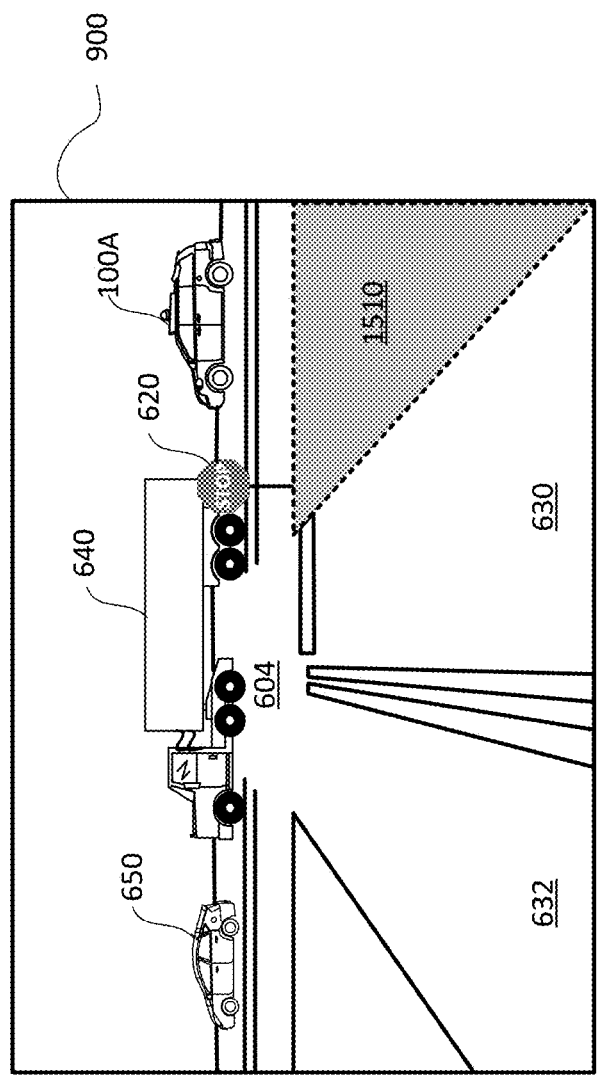
FIG. 15 is an example of an image and a label in accordance with aspects of the disclosure.
Figure 16:
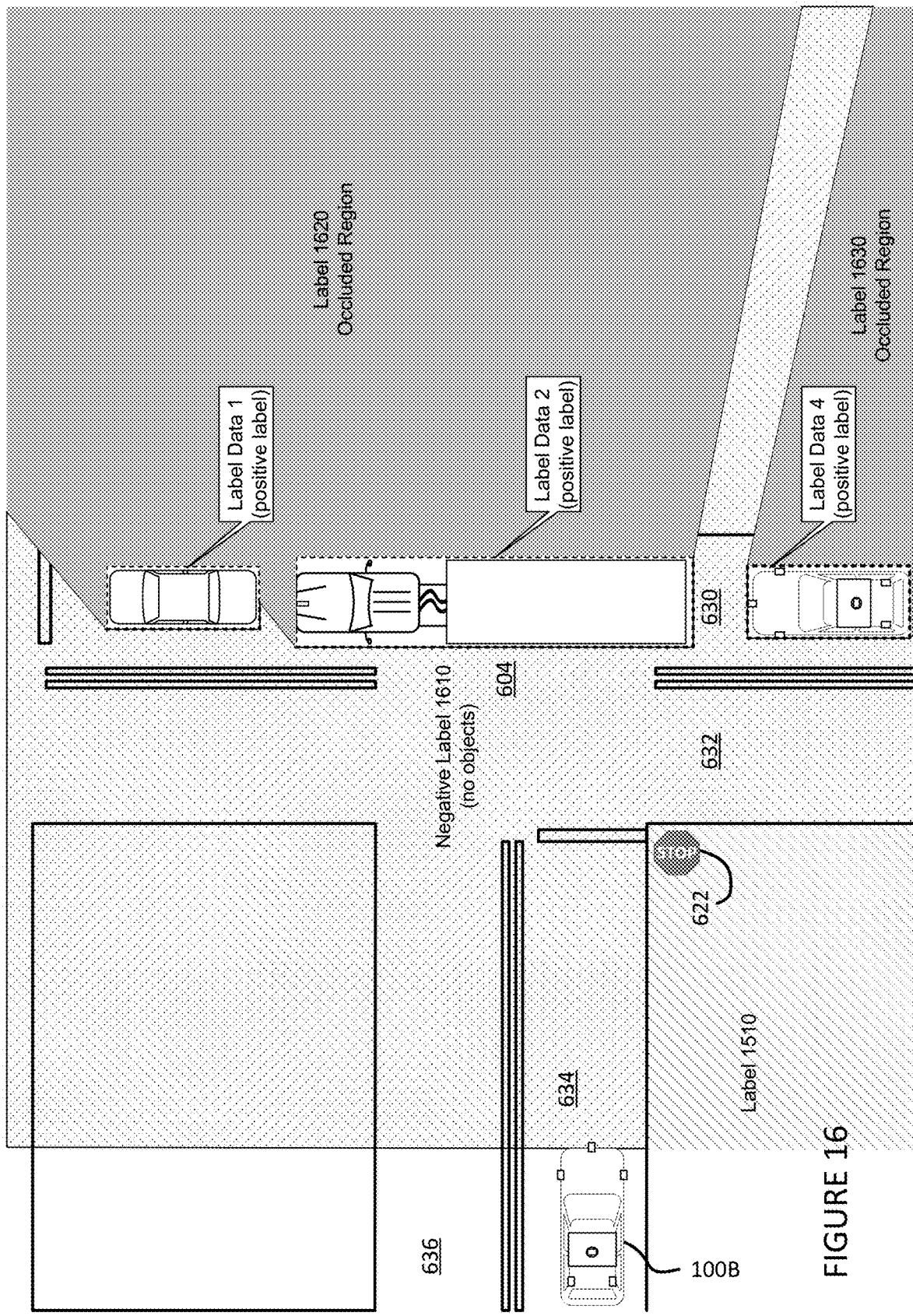
FIG. 16 is an example of a section of roadway, vehicles, and labels in accordance with aspects of the disclosure.

In other instances, in addition to transferring the various types of labels described above, it may also be useful to transfer "negative labels". FIGS. 15 and 15 provide examples of negative labels. For instance, FIG. 15 includes a negative label 1510, and FIG. 16 includes negative labels 1510, 1610, 1620, 1630. Negative labels may refer to areas where surfaces were identified as background area or similar features such as for negative labels 1510, 1610. As another example, negative labels, such as any of negative labels 1510, 1610, 1620, 1630, may correspond to areas of the sensor data that were purposefully not labeled by a human operator, perception system, or other system of a vehicle, for instance, to speed up processing of the sensor data, etc. As another example, the negative labels may describe any region where a human operator is certain there are no objects present such as with negative label 1610, to distinguish from regions where objects may or may not be present but the labeler could not make that determination because e.g. the region was occluded such as with negative label 1620, 1630. In some cases, negative labels may be generated automatically from laser sensor data, where the laser passing through a region without generating a return point means that region must be free space and contain no objects such as with negative label 1610. These negative labels may be useful for training detectors and correctly evaluating false positive and false negative rates. Without such negative labels, it may appear that the transferred labels were somehow deficient because the areas of those negative labels may not otherwise have any labels.

In addition to automatically labeling sensor data by transferring labels, additional information about the vehicle that captured the sensor data from which the labels are transferred may be used to generate an additional label. For example, the estimations of a vehicle's dimensions, location, speed, acceleration/deceleration, etc. which are performed by the systems of that vehicle may be significantly more accurate than what can be determined by observing the vehicle externally. For example, high frequency of the vehicle's pose updates (which may be on the order of 100 Hz or more or less), as well as the vehicle's direct estimation of its own steering angle, angular velocity, and acceleration using the vehicle's inertial measurement units (IMU)s, gyroscopes, and wheel and/or steering encoders, mean the fidelity of such spatial properties may be much more accurate than a human labeler using laser data could achieve (who may be labeling data for sensor data captured at 10 Hz, with quantities other than position derived by differencing subsequent frames and thus yielding higher error than direct measurements). Other data may also not necessarily be perceptible in the sensor data to which the labels are transferred such as whether a sliding door is open, whether a brake is applied, and all sorts of internal stages of the vehicle. In this regard, the characteristics of a vehicle may be used to generate a new label for that vehicle, and this new label may also be "transferred" to other sensor data.

Figure 17:
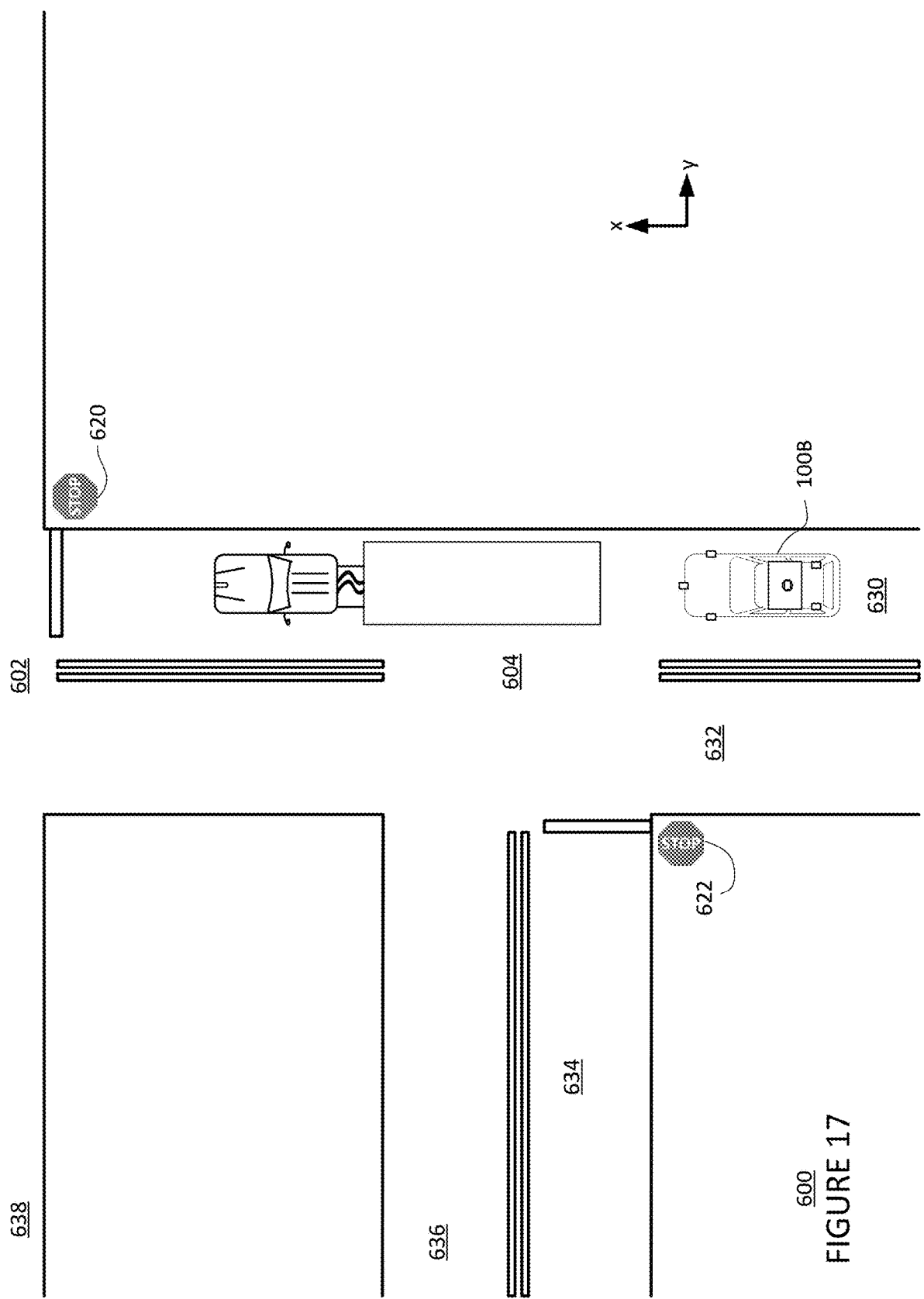
FIG. 17 is an example of a section of roadway and vehicles in accordance with aspects of the disclosure.

Vehicles that are located nearby one another will occur more frequently in areas where there are greater numbers of vehicles collecting the aforementioned sensor data driving around. However, in some instances, such as where the density of such vehicles is very low, vehicles may intentionally be sent to different locations in pairs in order to maximize the ability to generate labels for objects in the sensor data from each vehicle of the pair. This may be especially useful in vehicles with different sensor configurations. As one example, a pair of vehicles may include a car or other type of passenger or non-passenger vehicle, such as vehicle 100, 100A or 100B, and an autonomous tractor trailer. For example, FIG. 17 depicts an example of such a configuration where vehicle 100A is paired with tractor trailer 640. In this example, tractor trailer 640 may also be an autonomous vehicle with various systems such as those described above with respect to vehicle 100. With a tractor trailer's size and shape, it can be difficult to collect sensor data in certain areas (e.g. close to the tractor trailer or even far away) reliably. For instance, if another vehicle is tailgating the tractor trailer (e.g. driving very close to the rear of the tractor trailer), the tractor trailers sensors may not accurately or completely detect the vehicle, As such, when the car is positioned immediately behind the tractor trailer, the car can be used to generate sensor data and corresponding labels for objects, and these labels can then be applied to the sensor data collected by the perception system of the tractor trailer.

The features described herein may enable the automatic generation of highly-accurate three-dimensional labels for sensor data with very little costs in terms of time or processing power. A label from sensor data generated by a perception system of one vehicle may not necessarily be useful for another vehicle. However, by converting the location of that label from the local coordinate system for the one vehicle to the local coordinate system of the another vehicle, the label may become particularly useful for various types of purposes, including machine learning. In addition, by transferring labels generated by two vehicles with different positions and orientations, the sensor data from a first vehicle can be labeled for objects which may otherwise have not been detected by the first vehicle as they were beyond the first vehicle's perception range or occluded due to other objects or weather conditions. Further, in some situations labels generated by the first vehicle's perception system may have lower confidence values due to factors such as distance to the object or whether the object was partially occluded. In situations in which the second vehicle may have been closer to the object or have a better perspective view of that object, the labels generated by the second vehicle may have a higher confidence than labels generated by the first vehicle. Therefore, transferring the labels from the second vehicle to the sensor data generated by the first vehicle, may provide labels for the sensor data generated by the first vehicle that have higher confidence than the labels generated by the first vehicle.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for automatically generating labels for sensor data, the method comprising:
identifying, by one or more processors, first sensor data for a first vehicle, wherein the first sensor data was captured by one or more sensors of a first vehicle at a first location during a first timeframe, wherein the first location is defined in both a global coordinate system and a local coordinate system for the first vehicle;

identifying, by the one or more processors, a second vehicle based on a second location of the second vehicle within a threshold distance of the first vehicle within the first timeframe, wherein the second vehicle is associated with second sensor data captured by one or more sensors of the second vehicle at the second location during a second timeframe that overlaps with the first timeframe, wherein the second sensor data is associated with a label identifying a location of an object, the location of the object being defined in a local coordinate system of the second vehicle, and wherein the second location is defined in both the global coordinate system and the local coordinate system;

determining, by the one or more processors, a conversion from the local coordinate system of the second vehicle to the local coordinate system of the first vehicle;

applying the conversion to the location of the object identified in the label; and transferring, by the one or more processors, the label with the conversion applied to the location to the first sensor data.

2. The method of claim 1, wherein the local coordinate system for the vehicle is defined by a location of the vehicle at a time when the first vehicle was last turned on before the first sensor data was generated.

3. The method of claim 1, wherein the one or more sensors include one or more of a LIDAR sensor, camera, radar, sonar, or microphone.

4. The method of claim 1, wherein the threshold distance is a radial distance from the first location.

5. The method of claim 1, wherein the threshold distance corresponds to an area beyond a sensor range of at least one of the one or more sensors of the first vehicle.

6. The method of claim 1, wherein the threshold distance includes an orientation component.

7. The method of claim 1, wherein the second sensor data is further associated with a second label for the object, and wherein the second label is also transferred to the first sensor data.

8. The method of claim 7, wherein the second label identifies a type of the object.

9. The method of claim 1, wherein determining the conversion includes determining a difference between global coordinate system coordinates of an origin of the local coordinate system of the first vehicle and global coordinate system coordinates of an origin of the local coordinate system of the second vehicle.

10. The method of claim 9, wherein the global coordinate system coordinates of the origin of the local coordinate of the first vehicle may be determined from both the global coordinate system definition of the first location and the local coordinate system for the first vehicle definition of the first location.

11. The method of claim 10, wherein the global coordinate system coordinates of the origin of the local coordinate of the second vehicle may be determined from both the global coordinate system definition of the second location and the local coordinate system for the second vehicle definition of the second location.

12. The method of claim 9, wherein applying the conversion includes subtracting the difference from the location of the object.

13. The method of claim 1, wherein the first sensor data and second sensor data are time synced via GPS timing signals.

14. The method of claim 1, wherein transferring the label with the conversion applied to the location to the first sensor data comprises associating the label with the object in the first sensor data.

15. A system for automatically generating labels for sensor data, the system comprising one or more processors configured to:

identify first sensor data for a first vehicle, wherein the first sensor data was captured by one or more sensors of a first vehicle at a first location during a first timeframe, wherein the first location is defined in both a global coordinate system and a local coordinate system for the first vehicle;

identify a second vehicle based on a second location of the second vehicle within a threshold distance of the first vehicle within the first timeframe, wherein the second vehicle is associated with second sensor data captured by one or more sensors of the second vehicle at the second location during a second timeframe that overlaps with the first timeframe, wherein the second sensor data is associated with a label identifying a location of an object, the location of the object being defined in a local coordinate system of the second vehicle, and wherein the second location is defined in both the global coordinate system and the local coordinate system;

determine a conversion from the local coordinate system of the second vehicle to the local coordinate system of the first vehicle;

apply the conversion to the location of the object identified in the label; and transfer the label with the conversion applied to the location to the first sensor data.

16. The system of claim 15, wherein the local coordinate system for the vehicle is defined by a location of the vehicle at a time when the first vehicle was last turned on before the first sensor data was generated.

17. The system of claim 15, wherein the second sensor data is further associated with a second label for the object, and wherein the second label is also transferred to the first sensor data.

18. The system of claim 17, wherein the second label identifies a type of the object.

19. The system of claim 15, wherein determining the conversion includes determining a difference between global coordinate system coordinates of an origin of the local coordinate system of the first vehicle and global coordinate system coordinates of an origin of the local coordinate system of the second vehicle.

20. The system of claim 15, wherein transferring the label with the conversion applied to the location to the first sensor data comprises associating the label with the object in the first sensor data.

* * * * *